United States Patent [19]

McGurrin et al.

[11] Patent Number: 5,760,776

[45] Date of Patent: Jun. 2, 1998

[54] MENU EDITOR FOR A GRAPHICAL USER INTERFACE

[75] Inventors: Scott H. McGurrin, Belmont; Steven P. Muench, San Francisco; Stephen Mark Andrew Clark, Fremont, all of Calif.

[73] Assignee: Oracle Corporation, Redwood Shores, Calif.

[21] Appl. No.: 571,445

[22] Filed: Dec. 13, 1995

[51] Int. Cl.$^6$ .................................................. G06F 3/00

[52] U.S. Cl. .................................................. 345/353

[58] Field of Search ........................ 395/333, 334, 395/352, 353, 357; 345/146, 902

[56] References Cited

U.S. PATENT DOCUMENTS

| | | | |
|---|---|---|---|
| 4,931,783 | 6/1990 | Atkinson | 395/353 X |
| 5,119,475 | 6/1992 | Smith et al. | 395/353 |
| 5,243,697 | 9/1993 | Hoeber et al. | 395/353 |
| 5,432,897 | 7/1995 | Tatsumi et al. | 395/140 |
| 5,485,175 | 1/1996 | Suzuki | 395/353 |
| 5,500,936 | 3/1996 | Allen et al. | 395/352 X |
| 5,530,796 | 6/1996 | Wang | 395/352 |
| 5,627,960 | 5/1997 | Clifford et al. | 395/352 |

*Primary Examiner*—A. Katbab
*Attorney, Agent, or Firm*—Blackely, Sokoloff, Taylor & Zafman LLP

[57] ABSTRACT

A method of manipulating one of a plurality of branches of a menu structure within a window of a menu editor in a graphical user interface is described. A handle associated with a first branch of the plurality of branches is provided. The first branch is associated with a first menu item of the menu structure. The handle is selected. The first branch is moved in response to a cursor control device to associate the first branch with a second menu item of the menu structure. The first branch is disassociated with the first menu item. The first branch is associated with the second menu item of the menu structure.

14 Claims, 5 Drawing Sheets

MENU EDITOR FOR A GRAPHICAL USER INTERFACE

FIELD OF THE INVENTION

This application relates to the field of graphical user interfaces. In particular, this application is related to menu editor improvements for graphical user interfaces.

BACKGROUND OF THE INVENTION

The advent of graphical user interfaces (GUIs) has enhanced the use and functionality of computers. If an operating system permits multiple applications to run "simultaneously", each application is typically associated with one or more graphical windows which appear on a computer display screen. "Simultaneously" is intended to mean from a user's viewpoint and not necessarily actually concurrently executing applications. The user may have the ability to switch between different applications executing on a computer by selecting and manipulating icons and windows which appear on the computer display. For example, a word processing application might be accessible through one window appearing on the display. A spreadsheet application might be accessible through another window appearing on the display. Alternatively a single application may have a number of windows displayed at any given time.

The windows associated with the applications are referred to as application windows. The windows could be arranged in any number of ways on the computer display. For example, these windows might (1) take up an entire display screen, (2) appear to be tiled such that they do not overlap, or (3) they might overlap. Examples of operating systems incorporating GUI functionality include the Microsoft Windows™, Windows 95, and Windows NT operating systems (Microsoft Corporation of Redmond, Wa.), the Apple Operating System (Apple Computer of Cupertino, Calif.), and IBM's OS/2™ (IBM Corporation of Armonk, N.Y.).

A user can typically interact with a graphical window by using a pointing device and/or a keyboard. Pointing devices include cursor control devices such as a mouse, a touch pad, a stylus, or the keyboard. A window can be manipulated (e.g., opened, closed, moved) by sending the window an "event" and manipulating the cursor control device. Typically the "event" comprises clicking or double-clicking a mouse button in a particular area near or within the boundaries of the window. However, an event can often also be signaled by a certain sequence of keystrokes on the keyboard.

Graphical user interfaces tend to have some features or elements in common. Application windows generally include title bars, menu bars, window control boxes, scroll bars, and borders. The menu bar or main menu includes a list of menu items. When one of the menu items is selected either a command will be executed or an individual menu with additional menu items will appear. There are many styles of menus which could appear depending upon the application and the user's preferences. A non-exclusive list of menu styles includes pull-down menus, pop-up menus, and tear-away menus.

Each individual menu generally includes a list of menu items. Some menu items may appear differently than others in order to indicate whether they are selectable by the user (i.e., enabled or disabled). Other menu items may have indicators next to them to inform the user of the status of an associated command-related option.

When a menu item is selected from an individual menu either an associated command will be executed or a submenu containing another list of menu items will appear. This submenu might appear as a cascading menu. Sometimes the fact that an individual menu will have an associated submenu is indicated on the individual menu by some graphical indicator next to the menu item associated with the submenu.

FIG. 1 illustrates a number of these graphical user interface elements for window 100. The boundaries of the window are indicated by border 150. Title bar 110 typically appears at the top of the window to inform the user of the application associated with the window. Window control 112 is used for moving, closing, or re-sizing the window. Main menu 120 usually appears across the top of the application window. The window may include a scroll bar such as vertical scroll bar 140. The scroll bar includes controls for incrementally scrolling up or down (144, 146). In addition, scroll bar 140 includes slide 142 for scrolling rapidly through the subject matter of window 100.

The user can select one of the menu items (122a thru 122b) on the main menu. The menu item (e.g., 122a) is typically associated with an individual menu 130 which appears when the menu item is selected. The individual menu may have the characteristics of a tear-away menu, a pull-down menu, or some other type of menu. The individual menu contains a list of menu items (e.g., 132a thru 132b) from which the user can select.

FIG. 2 illustrates one embodiment of a menu item (220) having an associated submenu 230. Special items are used to effectively provide additional information to the user without consuming prodigious amounts of display area within the window or additional usable space within menus. Separator lines (not shown) are often used to functionally group related menu items. A graphical indication such as arrowhead 240 might be used to indicate the presence of a submenu. A graphical indicator such as check mark 250 might be used to indicate that the indicated command is in effect or that the option is selected.

A menu editor is useful for designing the menus and the flow of control when menu items are selected from the main or individual menus. For example, a menu editor is used to design the main menu and place the menu items for the main menu. The menu editor is used to define properties such as the style of an individual menu (e.g., pull-down, tear-away) that appears when a menu item from the main menu is selected. The menu editor is also used to determine the menu items that appear in menus or submenus. A menu editor is used to select whether menu items are enabled or disabled (i.e., unavailable for selection).

In one embodiment, the relationships between the main menu and associated individual menus and submenus are conceptualized as a menu structure. This menu structure is somewhat analogous to a tree. The main menu is associated with the "root" of the menu structure. Each menu item of the main menu may have an individual branch (representing an individual menu). These individual branches may further branch into sub-branches (representing submenus). Any subset of the entire menu structure (e.g., branches and sub-branches) is also a menu structure.

One disadvantage of prior art menu editors is that only one menu command and associated branch of the menu structure is available for viewing at a time during the editing process. In other words, the branches associated with separate menu items will not both be simultaneously visible or available for editing.

Typically clicking on the main menu or its related menus to select them during the editing process might have undesirable results. The user may unintentionally invoke a procedure or action associated with the menu item instead of merely selecting the item for editing. Thus another disadvantage of prior art menu editors is the lack of a means for safely manipulating the menu structure without the risk of performing an unintended function during the editing process.

What is needed is an menu editor to permit improved visualization and manipulation of a menu structure during the editing process.

SUMMARY AND OBJECTS OF THE INVENTION

In view of limitations of known systems and methods, one of the objectives of the present invention is to provide a method to permit improved visualization of a menu structure during the process of editing the menu structure.

Another object is to provide a method to permit improved manipulation of the menu structure during the editing process.

A method of manipulating one of a plurality of branches of a menu structure within a window of a menu editor in a graphical user interface is described. A handle associated with a first branch of the plurality of branches is provided. The first branch is associated with a first menu item of the menu structure. The handle is selected. The first branch is moved in response to a cursor control device to associate the first branch with a second menu item of the menu structure. The first branch is disassociated with the first menu item. The first branch is associated with the second menu item of the menu structure.

A method of repositioning a menu structure within a window of a menu editor in a graphical user interface is also described. A first branch associated with a first menu item of a main menu is displayed in response to a selection event. A second branch associated with a second menu item of the main menu is displayed in response to a selection event. A first display area required for displaying the menu structure including the first and second branches is calculated. If the menu structure is positioned within the window such that the area available for displaying the menu structure is less than the first display area, then the menu structure is repositioned to a new location within the window.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The menu editor is used to create custom menus for the user's particular application. In order to build a custom menu, first a menu module is created. All menus, submenus, and menu commands associated with the custom menu are referred to as menu objects. Menu objects have properties that can be set to define their runtime functionality or default characteristics (e.g., enabled or disabled).

An application having a GUI will have an application window displayed on the computer display as previously discussed. Typically one or more "document" windows associated with the application window will also be displayed. The term "document" is not intended to be limited to a textual document and instead is a representation of data particularly associated with that application. For example, the document window for a word processing application may well be a textual document. The document window for a spreadsheet application is typically a spreadsheet. The document window for a disk file manager might illustrate a logical layout of the files physically stored on the disk.

Figure 1:
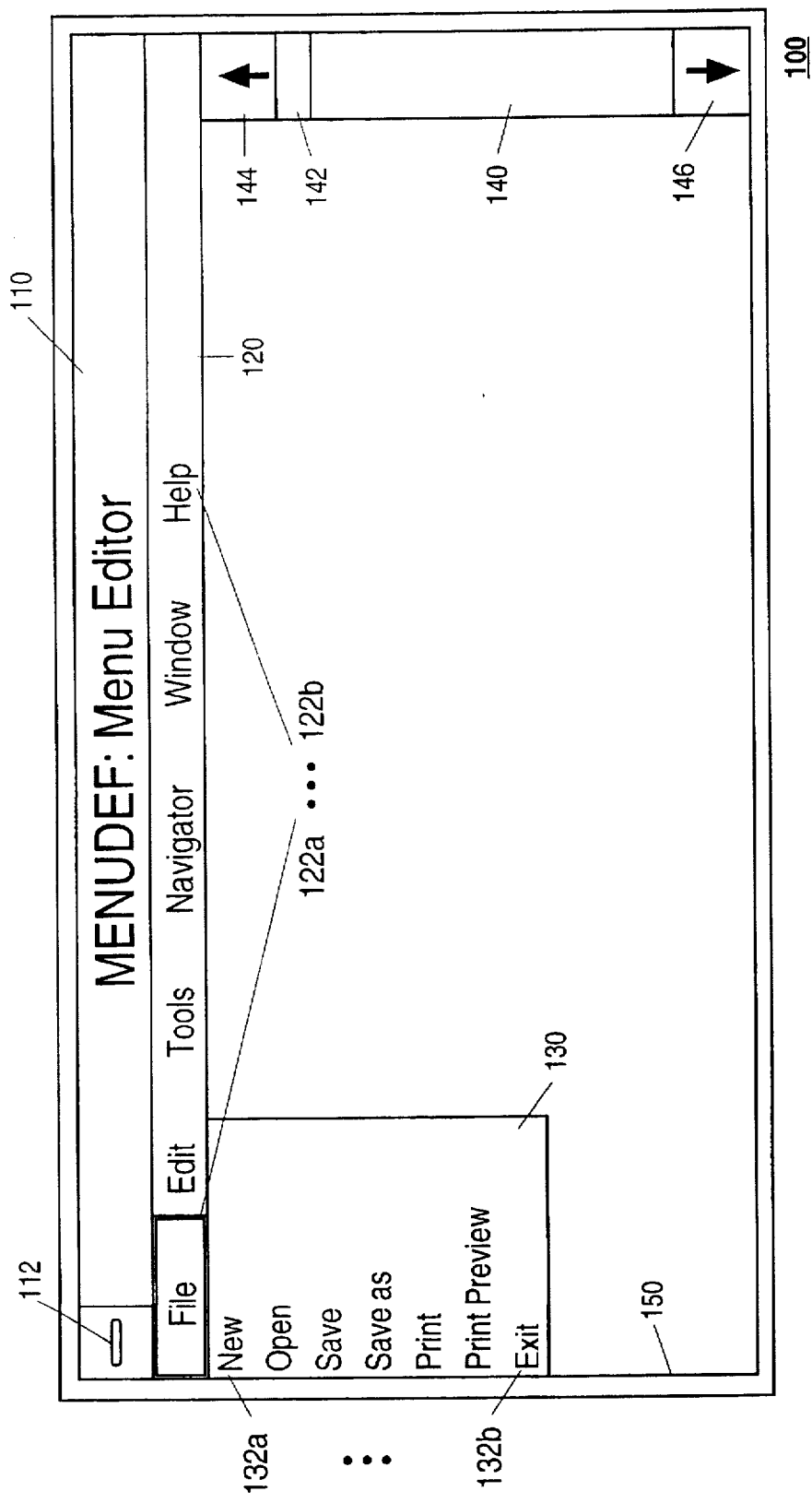
FIG. 1 is an illustration of a generic graphical user interface including elements of a typical window.
Figure 2:
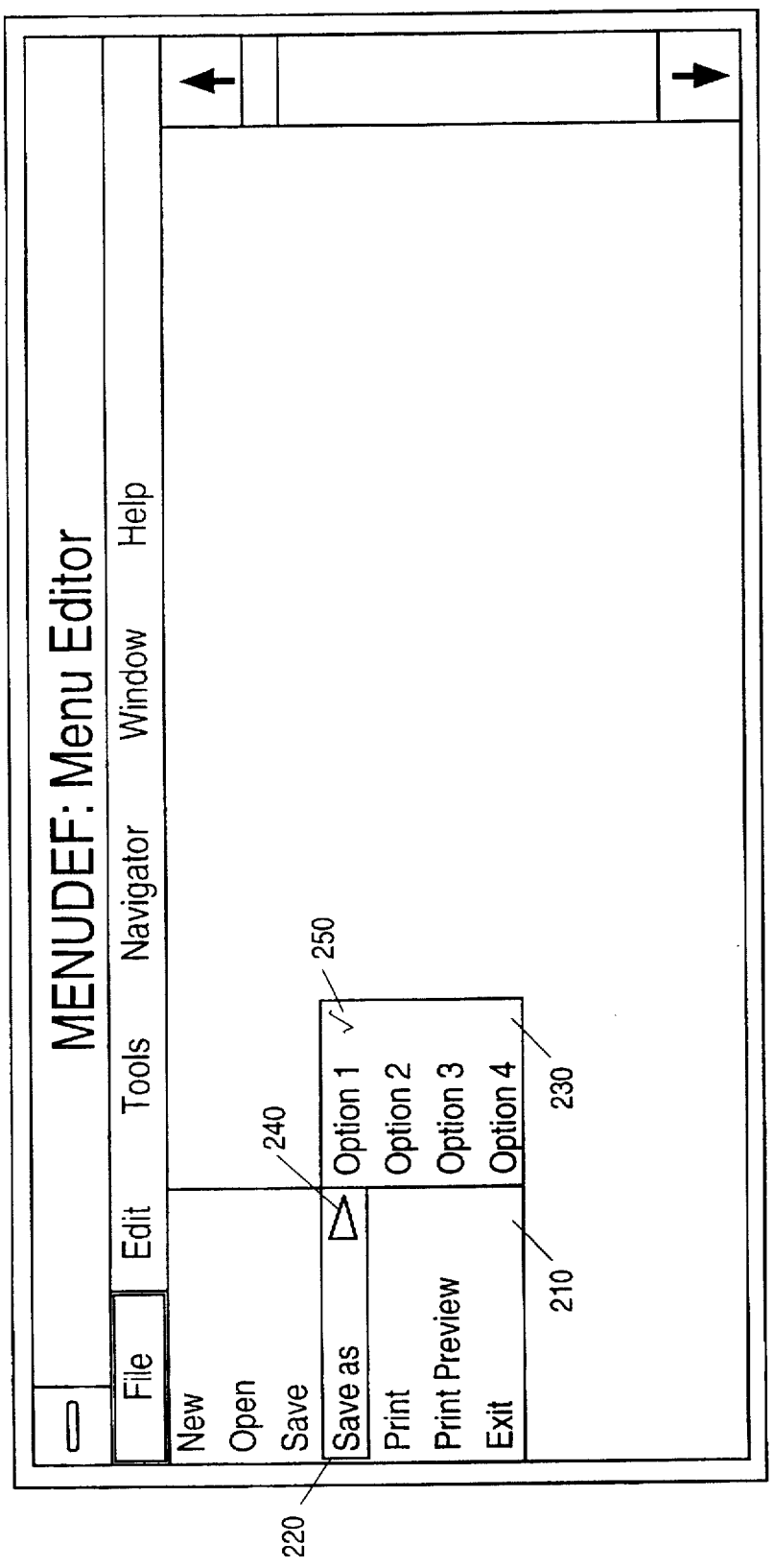
FIG. 2 illustrates a submenu of an individual menu.
Figure 3:
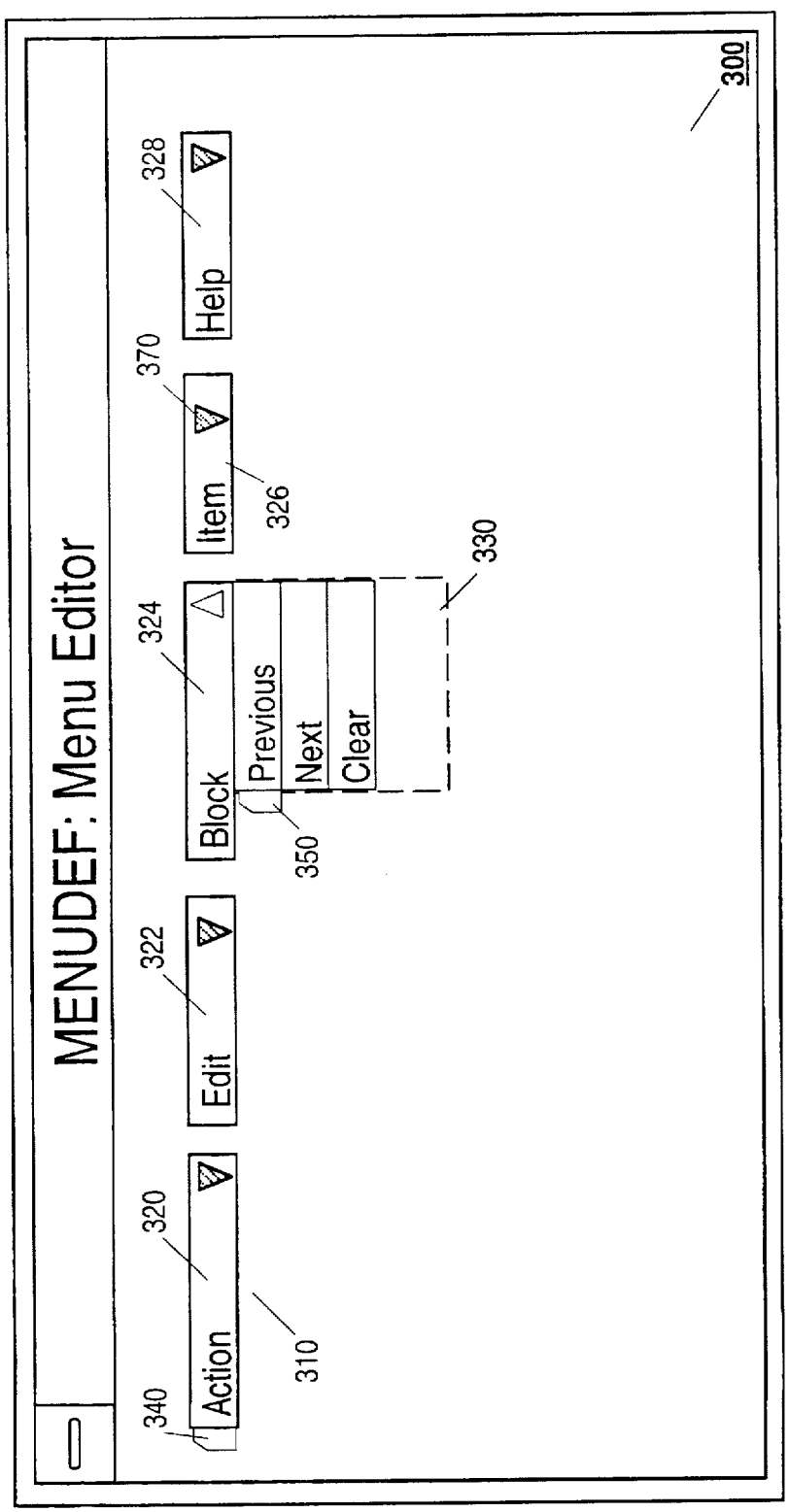
FIG. 3 illustrates a menu structure displayed by the menu editor including the handle feature.

In one embodiment, the document window for the improved menu editor is used to illustrate the menu structure currently being edited. The menu structure will appear only within the boundaries of the document window of the menu editor. FIG. 3 illustrates a menu editor document window with a sample menu structure. An editor will usually have a menu bar and a toolbar. The toolbar is typically a collection of icons representing functions such as copying, pasting, etc., that may be performed on the contents of the document window. Neither a menu bar for the document window nor a toolbar are illustrated in FIG. 3, because they will vary from embodiment to embodiment. The main menu being edited, main menu 310, includes menu items 320, 322, 324, 326, and 328. Individual menu 330 is associated with menu item 324.

During execution of the application that uses menu structure 300, individual menu 330 will appear when menu item 324 is selected. The menu editor is typically used to define various properties of every object of the menu structure. This would include the style of the individual menu and the conditions for which menu items should be enabled or disabled. Thus individual menu 330 may appear differently during execution of the application than it appears in the document window of the menu editor because of these property settings and the current operational state of the application.

In some prior art menu editors, an editable object of the menu structure is selected through the use of the cursor control device. For example, a pointing device such as a mouse is moved until the cursor is over or near the object to be selected. Then a mouse button is depressed to select the object the cursor is over or near. Movement of the object is subsequently accomplished by manipulating the cursor control device. One disadvantage of this prior art method of selecting the object is that the object may unintentionally be moved or resized if the cursor control device is moved after the object is selected. Furthermore, depressing the mouse button more than once may cause some unintended action depending upon the position of the cursor with respect to the objects of the menu structure. Thus another disadvantage of the prior art method of selecting objects in the menu editor is that there is a greater risk of performing an unintended function.

FIG. 3 illustrates one embodiment of a menu editor improvement that reduces the risk of accidental movement or performing unintended actions. Handle 340 is graphically associated with main menu or menu bar 310. The user selects menu bar 310 by "grabbing" handle 340. "Grabbing" in this context means selecting the handle with the cursor control device. The functionality of handle 340 is limited to selection and movement of the menu bar. Similarly other objects of the menu structure may be provided with handles (e.g., 350) to enhance the ease of selecting or manipulating those objects.

Figure 4:
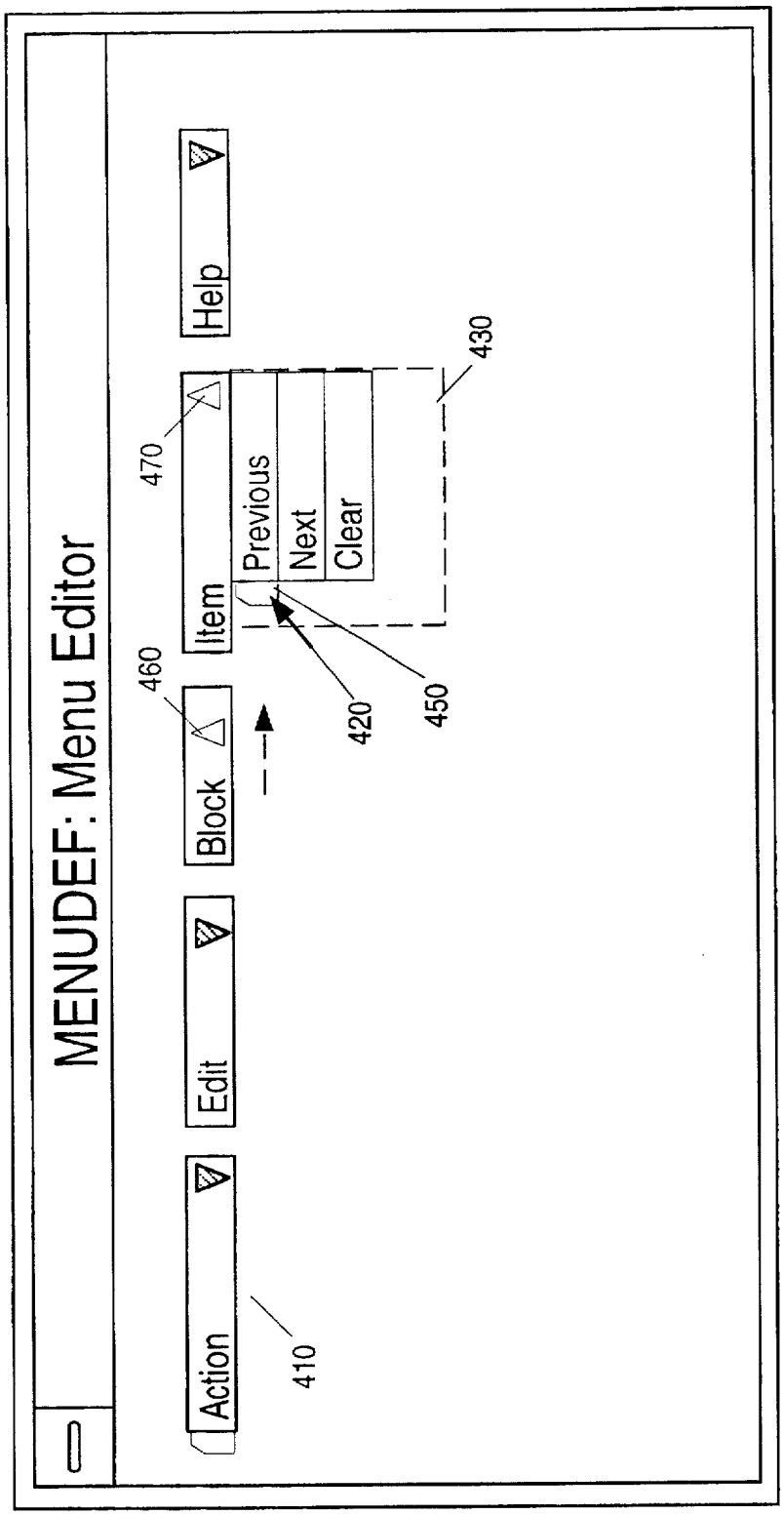
FIG. 4 illustrates the result of using the handle to move an individual menu.

FIG. 4 is intended to illustrate the result of grabbing handle 450 (i.e., 350 of FIG. 3) and moving the associated object (in this case branch 430 of the menu structure) using the cursor control device. The position of the cursor control device is indicated by arrow 420. The branch is now associated with a different menu command of menu bar 410.

In one embodiment, graphical indicators (e.g., arrowheads) are used to provide abbreviated visual clues to the menu structure. In other words, general knowledge of the structure is indicated without actually showing the full structure. Note that arrowheads 360 and 370 of FIG. 3 have changed their orientation and fill characteristics in FIG. 4 after moving branch 430. Arrowhead 360 was oriented upwards to indicate that any associated branch is currently being displayed and could be "rolled-up" into the main menu to avoid visual cluttering of the display. Arrowhead 370 is oriented downwards to indicate that any associated branch can be "rolled down" from the main menu in order to view its details. Arrowhead 370 is filled in to indicate that a branch is indeed associated with menu item 326.

When branch 330 is moved to associate it with another menu item, note that arrowhead 470 now points upward to indicate that any associated branch can be rolled up into the main menu to avoid cluttering the display. Arrowhead 460 (360 of FIG. 3) points downward to indicate that any branch associated with that menu item is currently being viewed. Arrowhead 460, however, is hollow to indicate that there is no branch associated with the menu item.

Figure 5:
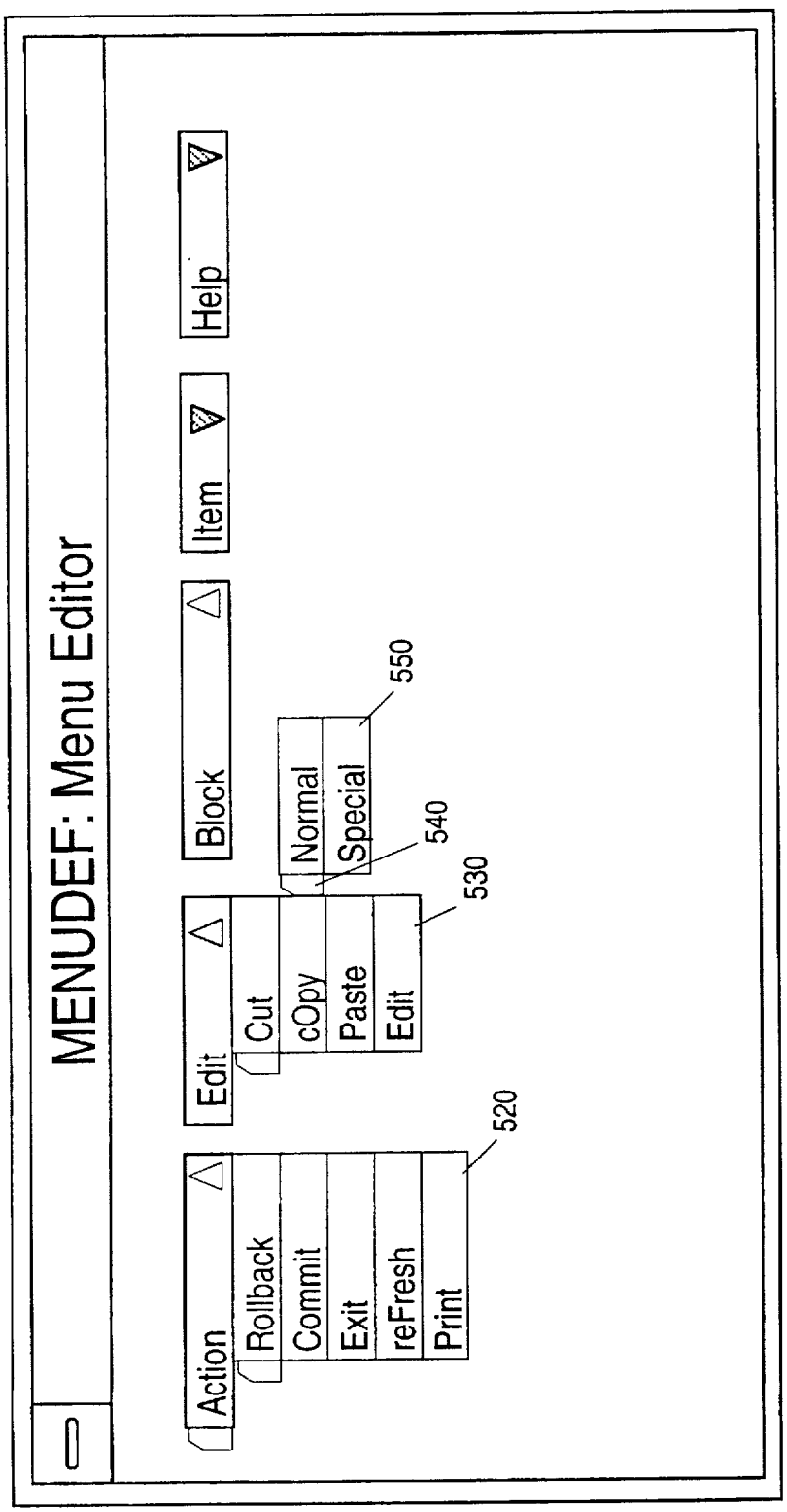
FIG. 5 illustrates displaying multiple branches of the menu structure as well as a handle on a submenu.

Another shortcoming of the prior art is that only one branch of the menu structure is displayed at a time. In other words, only one branch (i.e., an individual menu and perhaps a submenu) extending from a menu item on the main menu is displayed. FIG. 5 illustrates the advantage of displaying two or more selected branches of the menu structure at a time. By providing the user with a view of more than one branch, the user may more effectively conceptualize the flow of control in the menu structure. For example, an option may be enabled in one menu that may have an effect on an menu item or option in another menu. This may be best realized by permitting the designer to see both menus during the editing process.

Another advantage of displaying more than one branch is ease of manipulating the menu structure. For example, object handles may be provided to change the association of an object or branch with one menu item to a second menu item. That second menu item might be part of the main menu, an individual menu, or even a sub-menu. FIG. 5 illustrates first branch 520 and second branch 530 selected for display. By selecting a handle (e.g., 540), the user can move an associated object from one branch to another or to the main menu. Because any subset of the menu structure is also a menu structure, this principle can be generalized. In other words, the term "branch" inherently includes "sub-branches" associated with that branch. Thus any menu which is associated with a menu item can be referred to as a branch. The use of object handles permits ease of moving a branch from a first menu item to a second menu item and then disassociating the branch from the first menu item. The second menu item could be on the main menu, an individual menu, or a submenu, etc. Thus the branch may be move from one level within the menu structure to another level or the same level of the menu structure. The first and second menu items might even be on the same menu.

One advantage of using a graphical user interface is that the windows can typically be resized and moved to other locations on the display screen. This is particularly useful for expanding or contracting the viewable area of the subject matter of the window. If there is insufficient room available within the window for displaying a branch of the menu structure there are at least two options available for remedying the situation. In one embodiment, horizontal and/or vertical scroll bars are provided so that the user may scroll the contents of the window in order to view the complete menu structure a portion at a time. In an alternative embodiment, if repositioning the menu structure within the window permits the user to view the entire structure currently selected for viewing, then the menu structure is repositioned to a new location within the window calculated to permit viewing that portion of the structure currently selected for viewing. In other words, the menu structure may be positioned within the window such that the portion of the menu structure currently selected for viewing extends beyond the boundaries of the window. In such a case, the menu editor repositions the menu structure such that all or at least a greater portion of the structure selected for viewing appears within the boundaries of the window.

In alternative embodiments, a combination of these two options may be preferred. For example, in one implementation the menu structure might be repositioned so that the horizontal aspect of the menu structure is fully visible without scrolling, however the full menu structure might not be viewable without vertical scrolling. In other words, the menu structure is repositioned such that one of the scroll bars can be eliminated.

In contrast to attempting to display the entire menu structure or a larger portion of it, the designer may desire to limit his view of the menu structure to a more detailed portion of the entire menu structure. This might be desirable, for example, if a menu structure has long menus with numerous submenus. In such a case, a "zoom" tool proves to be useful. A zoom tool permits the designer to control the viewing magnification of the menu structure being displayed. When "zooming in" is selected, an area selected for viewing is magnified and redisplayed within the window. Without changing the window size, zooming in will necessarily limit the field of view (or portion of the menu structure still visible within the window). Alternatively, when "zooming out" the magnification of the menu structure is reduced. This may permit viewing a larger portion of the menu structure. Without changing the window size, however, the features of the viewed portion of the menu structure will appear smaller. In a graphical user environment, the designer performs the zoom function by clicking on one of a "zoom in" or a "zoom out" icon associated with the application window in one embodiment.

In one embodiment, the zooming function and the feature of automatically moving the menu structure within the window are used in conjunction with each other. When zooming in on the menu structure, the portion of the menu structure selected for viewing is magnified. This may result in a portion of the menu structure being occluded by the boundaries of the window. If the magnification is not too great, the menu editor repositions the portion of the menu structure selected for viewing such that the designer can view either 1) the same view of the menu structure as selected before magnification or 2) a larger portion of the menu structure than what was visible immediately after zooming in.

Similarly, when zooming out, the menu editor might automatically reposition the menu structure within the window such that the designer can view a larger portion of the menu structure. In one embodiment, the menu structure is repositioned after a zoom out function such that a maximal portion of the menu structure is available for viewing in the window. In other words, the menu structure is positioned in a manner so as to minimize the amount of scrolling.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method for manipulating a menu structure, comprising the steps of:
   a) providing a handle associated with a menu bar;
   b) selecting the handle; and
   c) moving the menu bar in response to a cursor control device.

2. A method of manipulating a menu structure comprising the steps of:
   a) providing a handle associated with a first branch of the menu structure, the first branch associated with a first menu item of a menu bar;
   b) selecting the handle;
   c) moving the first branch in response to a cursor control device;
   d) disassociating the first branch from the first menu item; and
   e) associating the first branch with a second menu item of said menu bar.

3. A method of manipulating a menu structure comprising the steps of:
   a) providing a handle associated with a sub-branch of a first branch of the menu structure, the sub-branch associated with a menu item of the first branch;
   b) selecting the handle;
   c) moving the sub-branch in response to a cursor control device;
   d) disassociating the sub-branch from the first menu item; and
   e) associating the sub-branch with a second menu item of the first branch.

4. A method of manipulating a menu structure comprising the steps of:
   a) providing a handle associated with a sub-branch of a first branch of the menu structure, the sub-branch associated with a menu item of the first branch;
   b) selecting the handle;
   c) moving the sub-branch in response to a cursor control device;
   d) disassociating the sub-branch from the menu item of the first branch; and
   e) associating the sub-branch with a menu item of a second individual branch.

5. A method of manipulating one of a plurality of branches of a menu structure comprising the steps of:
   a) providing a handle associated with a first branch of the plurality of branches, the first branch associated with a first menu item of the menu structure;
   b) selecting the handle;

c) moving the first branch in response to a cursor control device;
   c) disassociating the first branch from the first menu item; and
   d) associating the first branch with a second menu item of the menu structure.

6. The method of claim 5 wherein the first menu item and the second menu item are part of the same branch.

7. The method of claim 5 wherein the first menu item and the second menu item are not part of the same branch.

8. A computer system having a processor, a memory, and a graphical user interface comprising, in combination:
   a) a menu bar;
   b) a handle associated with said menu bar; and
   c) a cursor control device for grabbing said handle and moving said menu bar.

9. A computer system having a processor, a memory, and a graphical user interface comprising, in combination:
   a) a first branch of a menu structure, said first branch associated with a first menu item of a menu bar;
   b) a handle associated with said first branch; and
   c) a cursor control device for grabbing said handle, moving said first branch, disassociating said first branch from said first menu item, and associating said first branch with a second menu item of said menu bar.

10. A computer system having a processor, a memory, and a graphical user interface comprising, in combination:
    a) a sub-branch of a first branch of a menu structure, said sub-branch associated with a first menu item of said first branch;
    b) a handle associated with said sub-branch; and
    c) a cursor control device for grabbing said handle, moving said sub-branch, disassociating said sub-branch from said first menu item, and associating said sub-branch with a second menu item of said first branch.

11. A computer system having a processor, a memory, and a graphical user interface comprising, in combination:
    a) a sub-branch of a first branch of a menu structure, said sub-branch associated with a first menu item of said first branch;
    b) a handle associated with said sub-branch; and
    c) a cursor control device for grabbing said handle, moving said sub-branch, disassociating said sub-branch from said first menu item of said first branch, and associating said sub-branch with a menu item of a second branch of said menu structure.

12. A computer system having a processor, a memory, and a graphical user interface comprising, in combination:
    a) a first branch of a plurality of branches of a menu structure, said first branch associated with a first menu item of said menu structure;
    b) a handle associated with said first branch; and
    c) a cursor control device for grabbing said handle, moving said first branch, disassociating said first branch from said first menu item, and associating said first branch with a second menu item within said menu structure.

13. The computer system of claim 12 wherein said first menu item and said second menu item are part of the same branch within said menu structure.

14. The computer system of claim 12 wherein said first menu item and said second menu item are not part of the same branch within said menu structure.

* * * * *